United States Patent
Koshy

Patent Number: 5,635,035
Date of Patent: Jun. 3, 1997

[54] SURFACE IMPROVED TOWER PACKING

[75] Inventor: T. Daniel Koshy, Stow, Ohio

[73] Assignee: Norton Chemical Process Products Corporation, Worcester, Mass.

[21] Appl. No.: 527,309

[22] Filed: Sep. 12, 1995

[51] Int. Cl.$^6$ .............. B01D 3/34; B01D 47/00; B44C 1/22; C10J 1/08

[52] U.S. Cl. ............. 203/34; 261/112.1; 261/112.2; 261/DIG. 72; 216/100; 216/109

[58] Field of Search ............ 261/112.1, 112.2, 261/DIG. 72; 203/34; 216/100, 109

[56] References Cited

U.S. PATENT DOCUMENTS

| | | | |
|---|---|---|---|
| 2,917,292 | 12/1959 | Hittrich | 261/112.2 |
| 3,430,934 | 3/1969 | Weishawpt | 261/94 |
| 3,657,847 | 4/1972 | Castellucci | 51/313 |
| 4,333,893 | 6/1982 | Clyde | 261/94 |
| 4,668,442 | 5/1987 | Lang | 261/94 |
| 4,740,334 | 4/1988 | Rukovena, Jr. | 261/112 |
| 5,304,423 | 4/1994 | Niknafs et al. | 428/402 |

FOREIGN PATENT DOCUMENTS

| | | |
|---|---|---|
| 316497 | 11/1919 | Germany. |
| 1945048 | 9/1969 | Germany. |

*Primary Examiner*—Nina Bhat
*Attorney, Agent, or Firm*—David Bennett

[57] ABSTRACT

Etching the surfaces of a metal tower packing improves their wettability and therefore their efficiency in mass transfer applications.

7 Claims, No Drawings

SURFACE IMPROVED TOWER PACKING

BACKGROUND TO THE INVENTION

This invention relates to tower packings that are used for mass transfer applications in chemical processes. Mass transfer is generally defined as the transfer of a component or components between two mutually immiscible phases. The component transferred may be a physical ingredient of a mixture such as a volatilizable liquid, in which event a property such as heat may simultaneously be transferred.

Mass transfer is generally achieved by contact between two immiscible fluids and most commonly between a gas and a liquid. For the mass transfer to be most efficient, the components must have a very large area of contact and for this reason many devices, called "packing materials", have been created to maximize the contact area within chemical process towers wherein mass transfer takes place. There are two basic varieties of "packing materials" that are used in such towers: structured and dumped. Structured packings are designed to be fixed in place and located such that liquids spread over the surfaces in a thin film so as to maximize the area available for contact with a gas or immiscible fluid contacting the liquid so spread. The shapes are commonly in the form of corrugated sheets laminated together with the lines of the corrugations alternating right and left on either side of an axis of symmetry. Dumped packings are shapes that can be dumped into a tower to provide a large surface area without compacting together to produce an excessively high pressure drop across the tower or localized blockages. The shapes of these dumped packings are many and varied including saddles, rings, arches with bridge loops, "snowflake" shapes and the like.

It is clearly important for effective use of such packings that the process liquid wets the surface rather than forming rivulets or beads on the surface. There are several ways of expressing the wettability of a packing surface by a liquid. One measure is the critical surface tension of the solid material. Any liquid with a surface tension less than the critical surface tension of the solid will completely wet the surface. On the other hand it will not completely wet the surface if the liquid surface tension is greater than the critical surface tension of the surface material. Thus the material from which the packing is made will often be selected with this criterion in mind.

For many applications in which one or more of the components is corrosive or chemically active against otherwise suitable materials, expensive or compromise materials may have to be selected. Often however this is only a partial solution because the surface tension of the liquid varies from the top of the tower to the bottom as the composition changes as a result of mass transfer.

These problems are particularly acute in the distillation of dilute acids to remove water and concentrate the acid. The surface tension of pure water is very high, (about 72 dynes/cm), and does not wet the materials that might typically be used such as stainless steel which has a critical surface tension of about 46 dynes/cm. Thus while the more concentrated solution at the foot of the tower may wet the surface of the packing, the surface initially contacting the more dilute solution whose surface tension approaches that of water may not be fully wetted resulting in relatively poor mass transfer.

One measure of efficiency of mass transfer is the HETP value which is the height equivalent of a theoretical plate, (the "stage"), that is the height of the theoretical stage required to achieve a fixed amount of mass transfer. Clearly the lower the HETP value, the more efficient is the mass transfer taking place.

The present invention provides a method of achieving improved wettability of the surfaces of metal tower packings and consequently improved efficiency of mass transfer. The invention further provides metal tower packings with improved wettability and enhanced critical surface tension. In addition the invention provides metal tower packings particularly suited for the concentration by distillation of dilute acids.

DESCRIPTION OF THE INVENTION

In one aspect of this invention there is provided a process for increasing the critical surface tension of a metal tower packing by from 30 to about 90% by a process which comprises treating the packing material with an acid at a concentration that is effective to etch the surface of the metal.

In a second aspect, the invention provides a metal packing having a chemically etched surface and an HETP reduced by at least 20% with respect a similar metal packing with an un-etched surface.

In a further aspect the invention provides a method of concentrating weak acids by a process which comprises passing the weak acid countercurrent to a vapor stream down a tower containing metal tower packing materials the surfaces of which have been etched using a strong acid to the extent necessary to reduce the HETP of the materials by at least 20% with respect to the un-etched materials.

The acid chosen to etch the surfaces should preferably be one that does not result in the formation of a passivating layer on the metal surface since this limits the etching that can take place. Where the metal is steel therefore the preferred acids are hydrochloric and hydrofluoric acids and concentrated acetic acid since these produce an effective amount of etching in a relatively short time but in a manner that can be controlled.

Steel etched in the above manner can have its critical surface tension increased to a level that is much closer to that of water such as for example 50 dynes/cm, and preferably from about 65 to about 70 dynes/cm. It should be understood however that there is no "bright line" between wettability and non-wettability and that as the critical surface tension approaches that of the liquid flowing over the surface, it will be wetted to an increasing degree. In addition the presence of relatively minor amounts of dissolved materials in the liquid can have a significant effect on the surface tension. Thus the very dilute acid will have a surface tension that is lower than that of pure water.

The preferred treated packing materials have an HETP that is at least 20%, and more preferably at least 30% lower than the HETP before the etching process.

DESCRIPTION OF PREFERRED EMBODIMENTS

The invention is now more fully described with reference to the attached Example which is understood to be solely for the purpose of illustration and is intended to imply no essential limitation of the scope of the invention.

In industrial applications a dilute acid is concentrated by establishing a distillation system in which the dilute acid is fed to an intermediate point of a tower filled with trays, dumped packings or structured packings. During steady state operation of the distillation system, part of the liquid leaving the bottom of the tower, rich in acetic acid, is boiled in a reboiler and the vapor leaving the reboiler is admitted to the bottom of the tower and flows up a "stripping" section of the tower counter-current to the downward flowing liquid. During its upward journey the vapor is continually stripped of acid which enriches the acid content of the downward flowing liquid while the liquid is simultaneously stripped of water so increasing the water content of the vapor.

At the point at which the liquid feed enters the tower, the composition of the liquid in the tower should be similar to that of the feed, if that is, the tower has been properly designed. Depending on the temperature and pressure of the feed, either all of it would join the liquid leaving the section above the feed, (the "rectifying" section), and flow downwards, or part of it would vaporize and join the vapor leaving the stripping section and flow upwards and part would flow downwards.

The vapor leaving the top of the rectifying section, which is mostly water, is condensed in an overhead condenser and the condensate is split in a reflux drum with part being returned to the top of the rectifying section of the column and part withdrawn as overhead product, that is, water. In the rectifying section, the reflux on its downward journey continually gets enriched with acid, simultaneously exchanging water to the upward flowing vapor. During steady state operation of the system, the sum of the amounts of overhead and bottom products is matched by the amount of liquid entering the tower at the intermediate point.

When a steady state is established a fixed degree of concentration occurs and the degree of concentration depends on the efficiency of the mass transfer achieved by the packing. This efficiency, as was indicated above, is commonly measured by the HETP value of the packing. This value is measured according to a formula in which the key variables are the variation in the "transferred" substance, (in this case acid concentration) from the top of the column to the bottom.

It would not be practical to set up such a system to evaluate HETP, so a test rig is conventionally used in which a boiler containing the dilute acid is fitted with a tower filled with the packing to be tested and the system is run at "total" reflux with all vapor exiting the top of the tower being condensed in a condenser and then allowed to trickle down the tower over the packing. The reflux is continued until a steady state is reached at which point the concentrations at the top and bottom are measured and the HETP value for the packing is calculated. This is the test bed used in the following Example.

EXAMPLES

A tower was filled with a 20.06 feet depth of "Intalox" Structured Packing IT, obtainable from Norton Chemical Process Products Corporation, ("Intalox" is a registered trademark). This tower was used in the distillation of very dilute acetic acid. The mass transfer efficiency expressed as HETP ranged from just under 2.3 to about 2.5 feet as shown in Table 1. This corresponds to a very low efficiency and this is attributed to the fact that the packing was not wetted at least in the region in which the concentration was still very low at the top of the tower.

TABLE 1

| RUN NUMBER | #1 | | | #2 | | |
|---|---|---|---|---|---|---|
| $X_D$ wt % ACETIC | .099 | .086 | .088 | .217 | .215 | .198 |
| $X_P$ WT % ACETIC | 1.02 | .908 | .986 | 2.73 | 2.74 | 2.56 |
| HETP (FEET) | 2.49 | 2.46 | 2.40 | 2.30 | 2.29 | 2.27 |

The surface of the packing in a similar bed was then etched by distilling a more concentrated acid, (about 2.4% at the top and 73% at the bottom). This bed had a value for HETP of 1.5 to 1.6 feet. After repeated use to distill acetic acids of varying concentrations to increase the degree of etching of the surface, the tower was used to distill an acetic acid solution with a concentration of 0.025% at the top and 2.1% at the bottom. The HETP value had decreased to 1.3 feet, significantly lower than was obtained for even the distillation of the relatively concentrated acid, and roughly half that for the untreated packing materials.

Microscopic examination of the surfaces of the packing material indicated that significant surface etching had taken place.

In a series of runs using the etched bed described above under five different sets of concentration conditions the results obtained were as shown in Table 2 below. In each case the bed depth was 19.78 feet, (11 layers of ISP 1T above and 11 layers of ISP 2T (which typically has a 40% higher HETP than ISP 1T) below, the same arrangement as was used above to demonstrate the effect of etching), the tower and packing were of stainless steel, the pressure was atmospheric and the flow rate, expressed as the "capacity factor", $C_s$, was 0.13 to 0.16 feet/sec. The tower was operated as a total reflux column. The weight % of acetic acid at the top of the column, $(X_D)$, and at the bottom of the column, $(X_P)$, were measured and used to calculate the HETP at those conditions.

TABLE 2

| RUN # | $X_D$ wt % acid | $X_P$ wt % acid | HETP (feet) |
|---|---|---|---|
| #3 | 2.44 | 72.8 | 1.62 |
|  | 2.22 | 73.4 | 1.57 |
|  | 2.07 | 73.7 | 1.54 |
| #4 | 0.72 | 36.7 | 1.48 |
|  | 0.74 | 37.9 | 1.48 |
|  | 0.73 | 36.9 | 1.49 |
| #5 | 0.275 | 18.0 | 1.37 |
|  | 0.258 | 18.7 | 1.36 |
|  | 0.259 | 18.3 | 1.36 |
| #6 | 0.063 | 6.31 | 1.25 |
|  | 0.068 | 6.35 | 1.27 |
|  | 0.061 | 6.47 | 1.23 |
| #7 | 0.026 | 2.01 | 1.31 |
|  | 0.025 | 2.01 | 1.30 |
|  | 0.025 | 2.10 | 1.29 |

From the above it will be appreciated that a very high efficiency level, (measured by the HETP value), can be attained using the acid-etched metal packings in the distillation of even very dilute solutions of acetic acid.

The acid-etched packings of the present invention can also be used in a variety of mass transfer operations in which the wetting characteristics of the surface would be improved by a treatment to raise the critical surface tension of the packing surface. The utility of the present invention is therefore not restricted to the distillation-concentration of weak acids.

What is claimed is:

1. A method of concentrating weak acids by a process which comprises passing the liquid stream of weak acid down a tower containing metal tower packing materials countercurrent to a vapor stream comprising the acid and water passing up the tower and separating a liquid stream at the foot of the tower with an enhanced acid content, characterized in that the surfaces of the metal tower packing materials have been etched using a strong acid to the extent necessary to reduce the height equivalent to a theoretical plate (HETP) of the packing materials by at least 20% with respect to the unetched packing materials.

2. A method according to claim 1 in which the acid is selected from the group consisting of hydrochloric acid, hydrofluoric acid and concentrated acetic acid.

3. A process for increasing the critical surface tension of a metal tower packing by from 30 to about 90% by a process which comprises treating the packing material with an acid at a concentration that is effective to etch the surface of the metal.

4. A process according to claim 3 in which the tower packing is etched using an acid selected from the group consisting of hydrochloric acid, hydrofluoric acid and acetic acid.

5. A process according to claim 3 in which the tower packing is selected from the group consisting of dumped and structured tower packings.

6. A metal tower packing having acid-etched surfaces and a height equivalent to a theoretical plate, (HETP), reduced by at least 20% with respect a similar metal packing with unetched surfaces.

7. A metal tower packing according to claim 6 which is selected from the group consisting of dumped and structured tower packings.

* * * * *